(12) United States Patent  
Mohamadi

(10) Patent No.: US 10,878,708 B2
(45) Date of Patent: Dec. 29, 2020

(54) DRONE TERRAIN SURVEILLANCE WITH CAMERA AND RADAR SENSOR FUSION FOR COLLISION AVOIDANCE

(71) Applicant: Farrokh Mohamadi, Irvine, CA (US)

(72) Inventor: Farrokh Mohamadi, Irvine, CA (US)

( * ) Notice: Subject to any disclaimer, the term of this patent is extended or adjusted under 35 U.S.C. 154(b) by 193 days.

(21) Appl. No.: 15/912,495

(22) Filed: Mar. 5, 2018

(65) Prior Publication Data
US 2018/0253980 A1 Sep. 6, 2018

Related U.S. Application Data

(60) Provisional application No. 62/466,838, filed on Mar. 3, 2017.

(51) Int. Cl.
| | | |
|---|---|---|
| *G08G 5/00* | (2006.01) | |
| *G05D 1/02* | (2020.01) | |
| *G05D 1/00* | (2006.01) | |
| *G08G 5/04* | (2006.01) | |
| *B64C 39/02* | (2006.01) | |
| *G06K 9/66* | (2006.01) | |
| *G06K 9/00* | (2006.01) | |
| *G06N 3/04* | (2006.01) | |
| *G01S 13/86* | (2006.01) | |
| *B64D 47/08* | (2006.01) | |
| *G05D 1/10* | (2006.01) | |
| *G01S 13/935* | (2020.01) | |
| *G06N 3/08* | (2006.01) | |
| *G06K 9/46* | (2006.01) | |

(52) U.S. Cl.
CPC ......... *G08G 5/0069* (2013.01); *B64C 39/024* (2013.01); *B64D 47/08* (2013.01); *G01S 13/867* (2013.01); *G01S 13/935* (2020.01); *G05D 1/0055* (2013.01); *G05D 1/0202* (2013.01); *G05D 1/102* (2013.01); *G06K 9/0063* (2013.01); *G06K 9/00718* (2013.01); *G06K 9/66* (2013.01); *G06N 3/04* (2013.01); *G08G 5/0052* (2013.01); *G08G 5/0086* (2013.01); *G08G 5/04* (2013.01); *G08G 5/045* (2013.01); *B64C 2201/141* (2013.01); *G06K 9/4628* (2013.01); *G06K 2009/00738* (2013.01); *G06K 2209/21* (2013.01); *G06N 3/0454* (2013.01); *G06N 3/08* (2013.01)

(58) Field of Classification Search
CPC .... G08G 5/0069; G08G 5/0052; G08G 5/045; G08G 5/0086; G08G 5/04; B64D 47/08; G05D 1/102; G05D 1/0202; G05D 1/0055; G01S 13/867; G01S 13/935; G06K 9/00718; G06K 2009/00738; G06K 9/4628; G06K 2209/21; G06K 9/66; G06K 9/0063; G06N 3/0454; G06N 3/08; G06N 3/04; B64C 2201/141; B64C 39/024
USPC .......................................................... 701/28
See application file for complete search history.

(56) References Cited

U.S. PATENT DOCUMENTS

2010/0179760 A1* 7/2010 Petrini ................. G08G 5/0069
701/301
2019/0071069 A1* 3/2019 Nordbruch ........ B60W 50/0097

* cited by examiner

*Primary Examiner* — Maceeh Anwari
(74) *Attorney, Agent, or Firm* — Haynes and Boone, LLP

(57) ABSTRACT

A drone is provided with a convolutional neural network that processes a fusion of video and radar data to identify and avoid collision threats. The drone includes a transmitter for transmitting the video data to a remote convolutional neural network for identifying structures and for further identifying threats or faults with the structures.

7 Claims, 3 Drawing Sheets

DRONE TERRAIN SURVEILLANCE WITH CAMERA AND RADAR SENSOR FUSION FOR COLLISION AVOIDANCE

CROSS-REFERENCE TO RELATED APPLICATIONS

This application claims the benefit of U.S. Provisional Application No. 62/466,838, filed Mar. 3, 2017, the contents of which are hereby incorporated by reference in their entirety.

TECHNICAL FIELD

This application relates to drones, and more particularly to the surveillance of structures such as walls and pipelines with a drone including camera and radar sensor fusion for collision avoidance.

BACKGROUND

The monitoring of strategic structures such as road, pipelines, and walls is challenging. For example, the proposed border wall between the United States and Mexico would extend over 2,000 miles across relatively remote and unpopulated terrain. Similarly, pipelines or roads may also extend for many miles. Monitoring over such vast spaces with fixed cameras or other sensors would be very expensive and cumbersome. In contrast, drones have been developed that can cover hundreds of miles on a single battery charge (or alternative energy source such as fossil fuel or hydrogen fuel cells). But existing drones do not have the capabilities for autonomous monitoring of threats or problems to such structures. Moreover, even if such drones were developed, note that they must fly relatively fast to effectively monitor such extended structures. Conventional drones use proximity sensors for collision avoidance but such sensors are only effective at relatively low flight velocities.

Accordingly, there is a need in the art for the development of drones that can autonomously monitor extended structures at relatively high velocities yet still have effective collision avoidance.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To provide a robust system for monitoring of structures such as pipelines, transmission towers, walls, and land and maritime borders, drones are provided with a convolutional neural network (CNN) for the processing of data from camera and radar sensors for collision avoidance. In this fashion, the drones may fly at the relatively high speeds necessary for the monitoring over long ranges (e.g., 20 m/s or higher) yet have real-time collision avoidance. The fusion of radar and video data enables the drone CNN to monitor collision threats at relatively long ranges such as 200 meters that then gives the drone ample time to navigate around and avoid the collision threats.

To speed the training of the CNN, a transfer learning technique may be used in which a pre-existing commercial-off-the-shelf (COTS) CNN such as the Matlab-based "Alexnet" which has been trained on an ImageNet database having 1.2 million training images and 1000 object categories. The following discussion concerns the processing of one video image from a single camera on the drone but it will be appreciated that the collision avoidance technique disclosed herein is readily adapted to the processing of multiple video images from a corresponding plurality of cameras. In addition, the following discussion is directed to a drone with four radar sensors that are arranged with respect to an axis of the drone such that during normal flight, one radar beam is elevated, another looks towards the left of the axis, another to the right of the axis, and a final radar beam is directed below the drone axis.

Advantageously, suitable radar sensors include COTS millimeter-wave-based (76 to 77 GHz) automotive collision avoidance radars. To reduce clutter, relatively-narrow beam at far range collision avoidance radars may be used such as having a beam width of 2 degrees at 150 meters. But other beam widths may be used in alternative embodiments Using standard radar equations, the received signal strength from various targets may be estimated to create a scenario to train the CNN and demonstrate the utility of the resulting collision avoidance. After application of a threshold to the received radar signals, the range to obstacles having a signal strength greater than the threshold is determined so that the obstacle can be classified. The following classifications are exemplary and depend upon the velocity of the drone. Assuming a velocity of 10 m/s, an obstacle is classified into a "clear" state or category (no imminent threat of collision) if the obstacle is greater than 120 meters away. Should the obstacle be less than the clear range but less than an imminent threat of collision range, e.g., from 120 meters to 50 meters, the obstacle is classified into an "alert" category. Obstacles closer than 50 meters are classified into an "evasion" category as it signifies that the drone should take evasive action.

Figure 1:
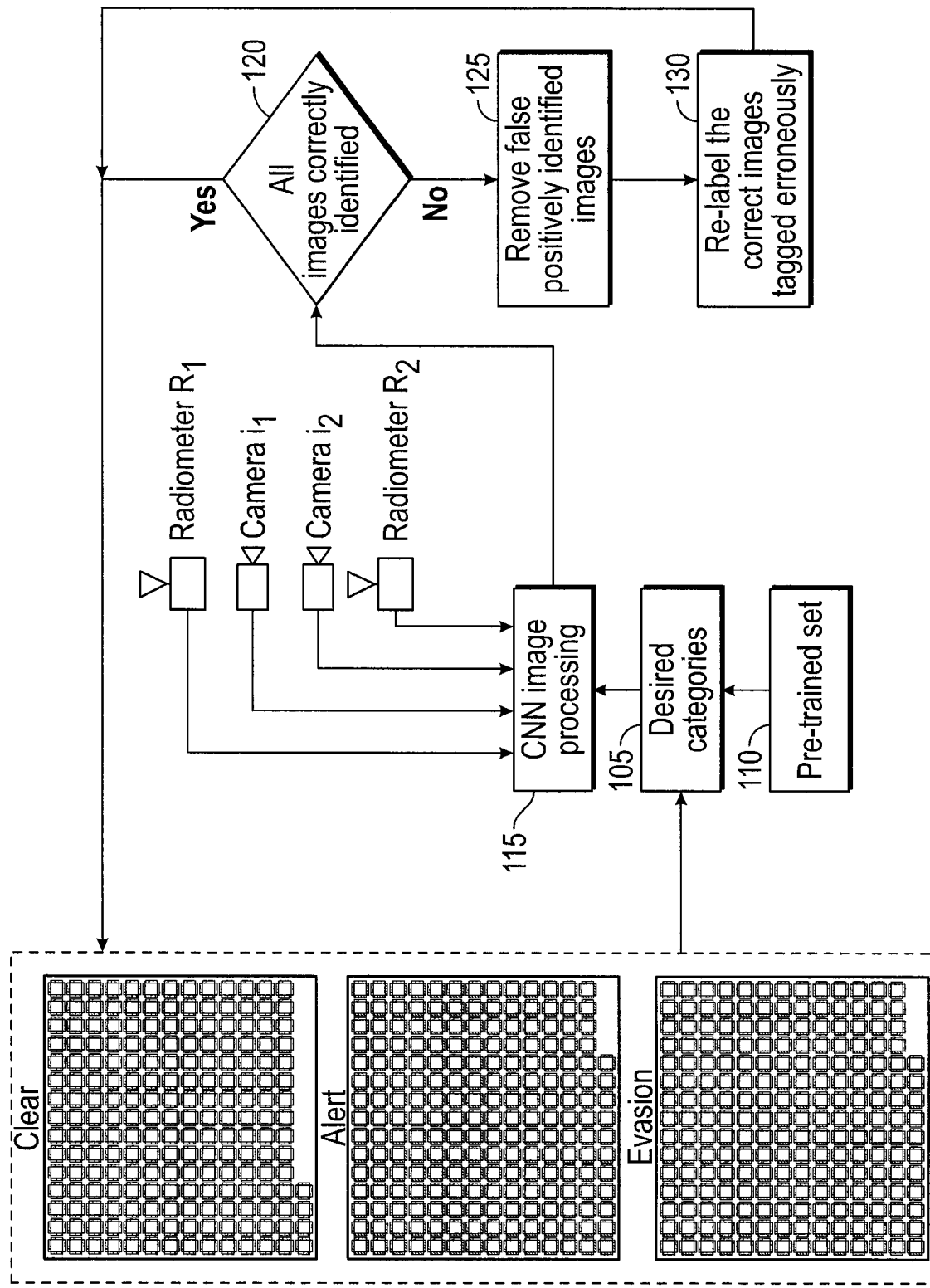
FIG. 1 illustrates a training process for a collision avoidance CNN using a fusion of video and radar data.

The resulting categories of obstacles from the thresholded received radar signals may be used as inputs to the CNN. The corresponding video image being fused with the radar sensor data is relatively coarsely pixelated to reduce the computational overload on the resulting CNN so that it is compatible with an integrated circuit graphics processing unit (GPU) that may be readily integrated into a drone. For example, the video frames may each be down sampled into 227 by 227 pixels (approximately 51,000 pixels per frame). The video camera is oriented to view along the velocity axis for the drone. The four radars are orientated about this velocity axis. An example video of several thousand frames may be used to train the COTS pre-trained CNN. The categories are clear, alert, and evasion as discussed with regard to the radar returns. The training of the CNN may proceed as shown in FIG. 1. Each video frame provides the 227 by 227 pixel input to the CNN. In particular, each pixel is represented by a digitization of its red, green, and blue (RGB) content. The resulting digital data and the radar categories of clear, alert, and evasion are used to train the CNN on the fusion of the video and radar data to produce the output decision of clear, alert, and evasion. An example training process is shown in FIG. 1. The video frames to be classified into clear, alert, and evasion categories form the desired categories 105 that will be added to the image data base 110 used to pre-train the COTS CNN. The video frames and radar data drive the CNN 115, which is then trained to classify the fusion of the radar and video data into the three categories. In general, there are a plurality of n radar sensors (radiometers) and a plurality n of video cameras. Two cameras and two radiometers are shown in FIG. 1 for illustration clarity.

Upon CNN processing, each frame is classified (labeled) into the three categories clear, evasion, and alert with some probability. Only frames satisfying a probability threshold (e.g., 70%) are deemed to be correctly labeled. Should the CNN processing result in a classification below the probability threshold, the frame is classified as a no detection (ND). There are thus four labels that may be assigned to a given frame: alert, evasion, clear, and ND.

A recursive training process may be used to enhance the resulting classification accuracy. In particular, a human operator may review the classification of fused data in a step 120. Should a video image be falsely labeled (ranked as clear, evasion, or alert with probability greater than the probability threshold), it is removed from the training data base in step 125. In addition, some ND classifications may be improper. Should there be fused data sets that rightfully should have been classified as alert, clear, or evasion but were classified as ND by the CNN, they may be properly classified in a step 130. The recursive training of CNN 115 would thus continue until step 120 indicates that all images have been properly identified.

Figure 2:
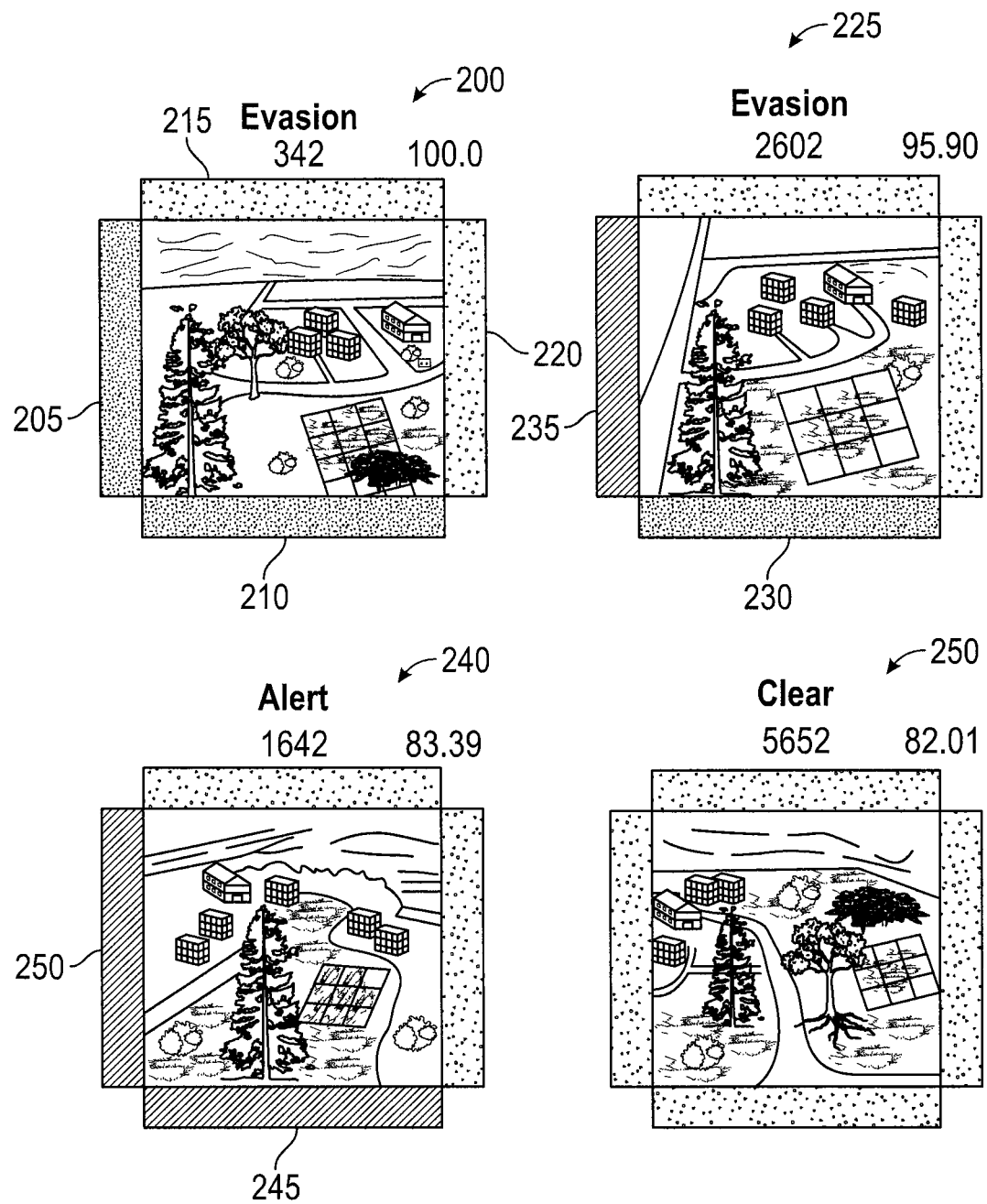
FIG. 2 illustrates some example video frames as classified by the collision avoidance CNN of FIG. 1.

The resulting CNN classification of the fused sensor data results in each video frame having a certain number of clear, alert, and evasion classifications depending upon the number of radar sensors being fused with the video frame. Should there be four radar sensors arranged about the video/velocity axis as discussed previously, some example frame classifications are as shown in FIG. 2. A first frame 200 shows that trees are relatively close below and to the left of its velocity/imaging axis (center point of the image). A left-side evasion 205 and a bottom evasion 210 are thus raised after CNN classification of the fusion of frame 200 with the corresponding radar data. This same CNN classification results in a top-side clear 215 and a right-side clear 220 for frame 200 due to the absence of obstacles in those directions. Frame 200 is thus classified as evasion. In this example, this classification or label occurred with 100% probability. In contrast, a frame 225 has only a bottom-side evasion 230 and a left-side alert 235. Due to the presence of evasion 230, frame 225 is labeled as evasion (in this example, with a probability of 95.9%). A frame 240 includes only a bottom-side alert 245 and a left-side alert 250 and no evasions. Frame 240 is thus classified as alert, albeit at a probability of 83.35%. Finally, a frame 250 has only clear alerts in all four directions. Frame 250 is thus labeled as clear by the CNN. In this example, frame 250 was labeled with a probability of 82%. The resulting alert, clear, and evasion warnings may be processed by a flight-control algorithm for the drone so that the drone may take evasive action as necessary to avoid collisions.

Training on just a few thousand fused video frames demonstrates a high level of accuracy, nevertheless the more frames that are used for training, the better will be the resulting collision avoidance. Note the advantages of fusing the radar and video data prior to the CNN processing. In particular, false alarms from the radiometers are clearly screened by CNN processing of the video frames from the same scene. In a similar fashion, obscure targets that are not in the field of view are detected by the short range and long range beamwidth of the radiometers. The following table 1 demonstrates the statistical data gathered from 7,350 video frames:

TABLE 1

|  | Alert | Clear | Evasion | ND |
| --- | --- | --- | --- | --- |
| Alert | 2206 | 57 | 125 | 0 |
| Clear | 201 | 2829 | 0 | 0 |
| Evasion | 35 | 0 | 1782 | 0 |
| ND | 0 | 0 | 0 | 115 |

There are four columns in Table 1, corresponding to the four radar sensor states of alert, clear, evasion, and ND. Similarly, there are four rows corresponding to the four possible labels assigned to the fused image/radar frames by the CNN. 2,2206 frames of video data that included alerts were properly labeled as alert frames. But there are 57 frames that were deemed clear by the radar data that were classified as alert by the CNN. In addition, the radar data resulted in 125 frames receiving an evasion classification whereas the CNN labeled these frames as alerts. The flight control for the drone can be based on the "worst-case" CNN or radar classification. In other words, the drone will conduct evasive action in response to an evasion classification regardless of whether the evasion classification resulted from the radar data alone or by the CNN. Similarly, an alert classification will always overrule a clear classification.

The resulting fusion of the radar and image data by the CNN is quite advantageous in that the overall probability of avoiding a collision is enhanced. For example, reliance on just the video data alone or the radar data alone from the 7,350 frames that were used to construct Table 1 results in a probability of avoiding collision of 92.75%. But the fused data results in a probability of 98.5%. It will be appreciated that as more training data is used, the probability for avoiding collisions will further improve.

Figure 3:
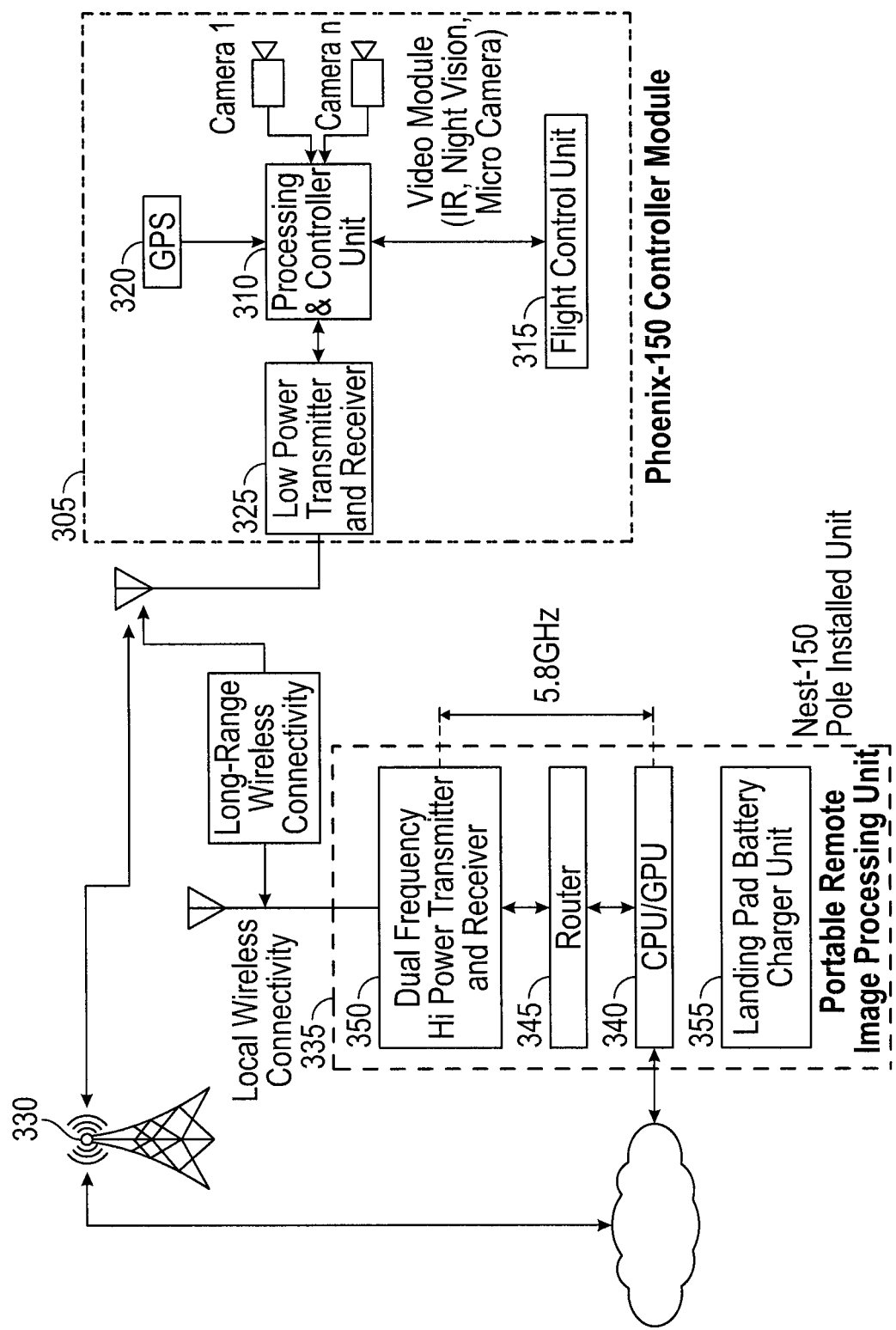
FIG. 3 illustrates an example system including a drone in accordance with an aspect of the disclosure.

The CNN processing for the drone to follow structures and detect threats or damage is more involved than the CNN processing for collision avoidance. A system is thus provided in which the CNN processing for the monitoring of structures is offloaded to the cloud. In this fashion, the cost of each drone is dramatically lowered as compared to requiring each drone to have such CNN processing capability. An example system including a drone 305 is shown in FIG. 3. For illustration clarity, the radar sensors are not shown. Similarly, drone 305 may incorporate additional sensors such as microphones that are also not illustrated. The cameras may include visible light cameras as well as infrared or other types of night vision cameras. The resulting video frames are fused with the radar data as discussed above and processed by the CNN in a processing and controller unit 310. Warning to avoid collisions from processing and controller unit 310 are processed in a flight control unit 315 that controls the speed of the propellers (not illustrated) to maneuver the drone accordingly. In general, it is conventional for a drone to include at least four propellers to control the four flight states of roll, pitch, yaw, and throttle (speed or velocity). However, it will be appreciated that drone 305 may include more than four propellers in alternative embodiments. A global positioning system (GPS) sensor 320 provides GPS positioning data to processing and control unit 310. Drone 305 also includes a low power transmitter/receiver 325 for transmitting the video frames for additional CNN processing. For example, transmitter/receiver may use 5G technology to transmit the video data to a cellular base station 330, which routes the video data through the cloud (Internet) to a remote image processing unit such as a portable remote image processing unit 335. Unit 335 includes a more powerful GPU (or CPU) for CNN processing of the video data to identify the structures being monitored and to identify any faults or threats to such structures.

A 5G link has high bandwidth. But in environments without a 5G link available, drone 305 could connect with remote image processing unit 335 through a WiFi link such as implemented using a router 345 and a dual frequency (e.g., 2.4 GHz/5.8 GHz) high-power transmitter and receiver 350. A battery charger such as a solar battery charger 355 powers remote image processing unit 335. GPU 340 implements machine vision such as through deep learning CNN networks to perform a visual inspection of designated paths along the desired structures such as pipelines, transmission towers, and land and maritime borders. Upon detection of intrusive vehicles, crowds, or fault conditions or threats, remote image processing unit 335 reports the GPS coordinates and identified class of object to a security agency. The CNN in GPU 340 may comprise a COT CNN trained using a transfer learning technique analogously as discussed with regard to the drone CNN.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. A drone, comprising:
    at least one video camera for capturing a video frame directed along an axis of the drone;
    a first collision avoidance radar configured to determine a first radar range to obstacles using a first radar beam that is displaced with respect to the axis, the first collision avoidance radar being further configured to classify the first radar range into a first clear category responsive to the first radar range being greater than a clear threshold range, a first alert category responsive to the first radar range being less than the clear threshold range and greater than an evasion range, and a first evasion category responsive to the first radar range being less than the evasion range; and
    a processor configured as a convolutional neural network (CNN) for processing a combination of the first clear category, the first alert category, the first evasion category, and pixels from the video frame to identify a plurality of collision avoidance conditions including a clear collision avoidance condition in which a CNN range to the obstacles is greater than a first range and an alert collision avoidance condition in which the CNN range to the obstacles is less than the first range and greater than a second range and an evasion collision avoidance condition in which the CNN range to the obstacles is less than the second range, wherein the second range is less than the first range, and
    a flight control system for controlling the drone to avoid a collision in response to the plurality of collision avoidance conditions.

2. The drone of claim 1, further comprising:
    a wireless transmitter for transmitting the video frame to a remote processing unit for identifying a structure selected from the group consisting of a security wall, a transmission tower, and a land or maritime border.

3. The drone of claim 2, wherein the wireless transmitter is a WiFi transmitter.

4. The drone of claim 1, wherein the first radar beam is displaced positively in elevation from the axis, the drone further comprising:
    a second collision avoidance radar configured to determine a second radar range to obstacles using a second radar beam that is displaced negatively in elevation with respect to the axis, the second collision avoidance radar being further configured to classify the second radar range into a second clear category responsive to the second radar range being greater than the clear threshold range, a second alert category responsive to the second radar range being less than the clear threshold range and greater than the evasion range, and a second evasion category responsive to the second radar range being less than the evasion range
    a third collision avoidance radar configured to determine a third radar range to obstacles using a third radar beam that is displaced positively in azimuth with respect to the axis, the third collision avoidance radar being further configured to classify the third radar range into a third clear category responsive to the third radar range being greater than the clear threshold range, a third alert category responsive to the third radar range being less than the clear threshold range and greater than the evasion range, and a third evasion category responsive to the third radar range being less than the evasion range; and
    a fourth collision avoidance radar configured to determine a fourth radar range to obstacles using a fourth radar beam that is displaced negatively in azimuth with respect to the axis, the fourth collision avoidance radar being further configured to classify the fourth radar range into a fourth clear category responsive to the fourth radar range being greater than the clear threshold range, a fourth alert category responsive to the fourth radar range being less than the clear threshold range and greater than the evasion range, and a fourth evasion category responsive to the fourth radar range being less than the evasion range, wherein the combination includes the second clear category, the second alert category, the second evasion category, the third clear category, the third alert category, the third evasion category, the fourth clear category, the fourth alert category, and the fourth evasion category.

5. The drone of claim 1, wherein the first range is approximately 200 meters and the second range is approximately 50 meters.

6. The drone of claim 1, wherein the processor comprises a graphics processing unit (GPU).

7. The drone of claim 1, wherein the convolutional neural network has been trained in a recursive fashion on a training data base of a plurality of training video frames such that training video frames that are not correctly classified by the convolutional neural are removed from the training data base.

* * * * *